United States Patent
Armstrong et al.

(10) Patent No.: US 8,327,055 B2
(45) Date of Patent: Dec. 4, 2012

(54) TRANSLATING A REQUESTER IDENTIFIER TO A CHIP IDENTIFIER

(75) Inventors: William J. Armstrong, Rochester, MN (US); David R. Engebretsen, Cannon Falls, MN (US); Steven M. Thurber, Austin, TX (US); Curtis C. Wollbrink, Rochester, MN (US); Adalberto G. Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 12/758,383

(22) Filed: Apr. 12, 2010

(65) Prior Publication Data

US 2011/0252173 A1 Oct. 13, 2011

(51) Int. Cl.
G06F 13/14 (2006.01)

(52) U.S. Cl. ......................................... 710/311; 710/308
(58) Field of Classification Search ................... 710/305
See application file for complete search history.

(56) References Cited

U.S. PATENT DOCUMENTS

| | | | |
|---|---|---|---|
| 6,643,724 B2 * | 11/2003 | Bauman et al. ............... 710/260 |
| 7,213,081 B2 * | 5/2007 | Narasimhamurthy et al. ... 710/2 |
| 7,464,191 B2 * | 12/2008 | Arndt et al. ..................... 710/10 |
| 7,493,425 B2 * | 2/2009 | Arndt et al. ..................... 710/28 |
| 7,506,084 B2 | 3/2009 | Moerti et al. |
| 7,519,761 B2 * | 4/2009 | Gregg ............................ 710/316 |
| 7,548,999 B2 * | 6/2009 | Haertel et al. .................. 710/62 |
| 7,549,003 B2 * | 6/2009 | Boyd et al. ..................... 710/104 |
| 7,571,273 B2 * | 8/2009 | Boyd et al. ..................... 710/316 |
| 7,587,575 B2 | 9/2009 | Moertl et al. |
| 7,590,817 B2 | 9/2009 | Moertl et al. |
| 7,594,058 B2 * | 9/2009 | Chia et al. ...................... 710/309 |
| 7,600,093 B2 | 10/2009 | Ben-Yehuda et al. |
| 7,660,912 B2 * | 2/2010 | Gregg ................................ 710/5 |
| 7,689,755 B2 * | 3/2010 | Balasubramanian et al. 710/311 |
| 7,694,047 B1 * | 4/2010 | Alston ............................. 710/62 |
| 7,849,287 B2 * | 12/2010 | Hummel et al. ............... 711/206 |
| 7,873,770 B2 * | 1/2011 | Hummel et al. ............... 710/266 |
| 7,934,033 B2 * | 4/2011 | Malwankar et al. .......... 710/104 |
| 7,979,592 B1 * | 7/2011 | Pettey et al. ...................... 710/3 |
| 2006/0195617 A1 | 8/2006 | Arndt et al. |
| 2006/0195623 A1 | 8/2006 | Arndt et al. |
| 2007/0061549 A1 | 3/2007 | Kaniyur et al. |

(Continued)

OTHER PUBLICATIONS

IBM Patent Application ROC920090046US1 entitled "Hierarchical to Physical Bus Translation" filed by William J. Armstrong et al. on Apr. 12, 2010.

(Continued)

Primary Examiner — Ryan Stiglic
(74) Attorney, Agent, or Firm — Owen J. Gamon

(57) ABSTRACT

In an embodiment a translation of RID (requester identifier) ranges to identifiers of north chips is stored into a south chip. A command that comprises a command RID is received at the south chip from a device. In response, a RID range is determined that encompasses the command RID, and a north chip identifier is found that is assigned a virtual function identified by the command RID. The command is sent from the south chip to the north chip identified by the north chip identifier. The translation comprises a RID compare value and a RID mask. A determination is made that the RID range encompasses the command RID by performing a logical-and operation on the command RID and the RID mask and comparing a result of the logical-and operation to the RID compare value.

16 Claims, 6 Drawing Sheets

U.S. PATENT DOCUMENTS

| | | |
|---|---|---|
| 2007/0067505 A1 | 3/2007 | Kaniyur et al. |
| 2007/0168643 A1* | 7/2007 | Hummel et al. ............... 711/207 |
| 2007/0300241 A1 | 12/2007 | Prakash et al. |
| 2008/0137677 A1* | 6/2008 | Boyd et al. .................... 370/419 |
| 2008/0168208 A1* | 7/2008 | Gregg ............................ 710/306 |
| 2009/0037614 A1 | 2/2009 | Saripalli |
| 2009/0089464 A1 | 4/2009 | Lach et al. |
| 2009/0133016 A1 | 5/2009 | Brown et al. |
| 2009/0133028 A1 | 5/2009 | Brown et al. |
| 2009/0144731 A1 | 6/2009 | Brown et al. |
| 2009/0268738 A1* | 10/2009 | Tchapda ....................... 370/392 |
| 2010/0153592 A1* | 6/2010 | Freimuth et al. ................ 710/38 |
| 2011/0022818 A1* | 1/2011 | Kegel et al. ................... 711/206 |
| 2011/0252176 A1* | 10/2011 | Tanaka et al. ................. 710/313 |

OTHER PUBLICATIONS

IBM Patent Application ROC920090047US1 entitled "Hierarchical to Physical Memory Mapped Input/Output Translation" filed by William J. Armstrong et al. on Apr. 12, 2010.

IBM Patent Application ROC920090048US1 entitled "Physical to Hierarchical Bus Translation" filed by William J. Armstrong et al. on Apr. 12, 2010.

* cited by examiner

| RID COMPARE VALUE | RID MASK | DESTINATION ID OF NORTH CHIP THAT OWNS VIRTUAL FUNCTION | |
|---|---|---|---|
| 0X0300 | 0XFFF0 | NORTH CHIP A | 401 |
| 0X0400 | 0XFFFC | NORTH CHIP A | 402 |
| 0X0404 | 0XFFFC | NORTH CHIP B | 403 |

REQUESTER IDENTIFIER TABLE 147-1

TRANSLATING A REQUESTER IDENTIFIER TO A CHIP IDENTIFIER

FIELD

An embodiment of the invention generally relates to computer systems and more particularly to translating a requester identifier of a device to an identifier of a chip with which the device communicates.

BACKGROUND

Computer systems typically comprise a combination of computer programs and hardware, such as semiconductors, transistors, chips, and circuit boards. The hardware within a computer system is typically organized into components, such as processors, storage devices, and I/O (Input/Output) devices. These components typically communicate with each other via another component called a bus.

Buses can be parallel buses, which carry data words or multiple bits in parallel on multiple wires, or serial buses, which carry data in bit-serial form. A bus can be point-to-point, meaning that the bus connects only two components, or multi-drop, meaning that more than two components are connected to the bus. In a multi-drop bus, typically the bus has both data and address wires, and components connected to the bus listen for their unique destination address on the address wires, in order to discern whether data on the data wires is intended for them.

One example of a computer bus is called PCI EXPRESS (PERIPHERAL COMPONENT INTERCONNECT EXPRESS), which uses a network of point-to-point serial links. A pair of point-to-point PCI EXPRESS serial links make up a lane. A hub routes the lanes and acts as a crossbar switch. This dynamic point-to-point behavior allows more than one pair of devices to communicate with each other at the same time. This format also allows channel grouping, where multiple lanes are bonded to a single device pair in order to provide higher bandwidth.

PCI EXPRESS devices communicate via a logical connection called an interconnect or link. A link is a point-to-point communication channel between two PCI EXPRESS ports, allowing both to send/receive ordinary PCI requests (e.g., configuration read/writes, I/O read/writes, and memory read/writes) and interrupts. At the physical level, a link comprises one or more lanes.

A lane comprises a transmit and a receive pair of differential lines. Each lane comprises four wires, meaning that, conceptually, each lane is a full-duplex byte stream, transporting packets containing the data in eight-bit byte format, between the two endpoints of a link, in both directions simultaneously. PCI EXPRESS transmissions send control messages, including interrupts, over the same links used for data.

SUMMARY

A method, computer-readable storage medium, and computer system are provided. In an embodiment a translation of RID (requester identifier) ranges to identifiers of north chips is stored into a south chip. A command that comprises a command RID is received at the south chip from a device. In response, a RID range is determined that encompasses the command RID, and a north chip identifier is found that is assigned a virtual function identified by the command RID. The command is sent from the south chip to the north chip identified by the north chip identifier. The translation comprises a RID compare value and a RID mask. A determination is made that the RID range encompasses the command RID by performing a logical-and operation on the command RID and the RID mask and comparing a result of the logical-and operation to the RID compare value.

BRIEF DESCRIPTION OF THE SEVERAL VIEWS OF THE DRAWINGS

FIG. 4 depicts a block diagram of an example data structure for a requester identifier table, according to an embodiment of the invention.

It is to be noted, however, that the appended drawings illustrate only example embodiments of the invention, and are therefore not considered a limitation of its scope, for the invention may admit to other equally effective embodiments.

DETAILED DESCRIPTION

Figure 1:
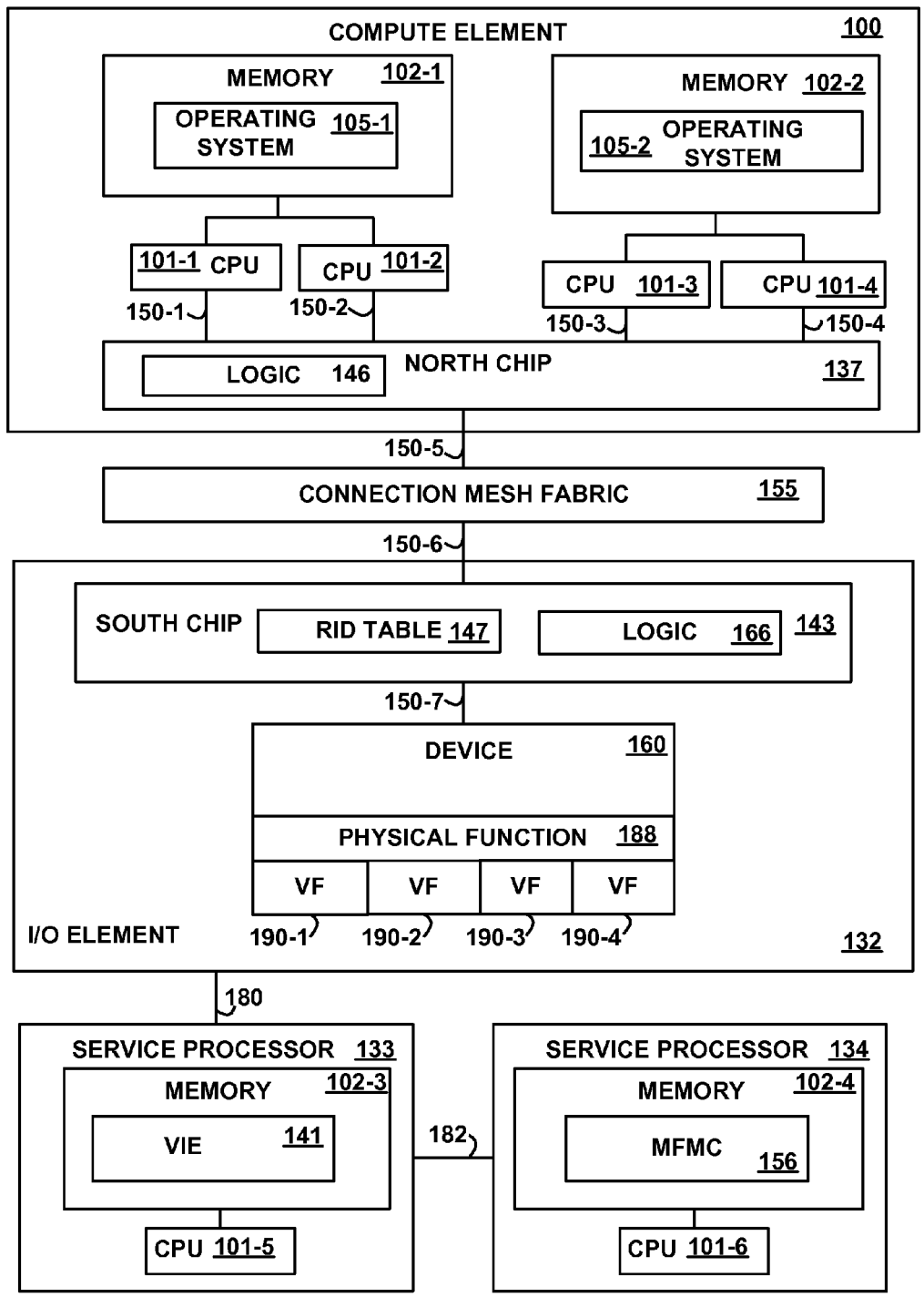
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system comprising the major components of a compute element 100 connected to an I/O (Input/Output) element 132 via a connection mesh fabric 155. The I/O element 132 is also connected to a service processor 133 via a communications link 180, and the service processor 133 is connected to another service processor 134 via a communications link 182. In various embodiments, the communications links 180 and 182 may be implemented as LANs (Local Area Networks), WANs (Wide Area Networks), telephone wires, Ethernet connections, buses, or any other appropriate links.

The major components of the compute element 100 comprise memory 102-1, memory 102-2, central processing units (CPUs) 101-1, 101-2, 101-3, and 101-4, and a north chip 137. The CPUs 101-1 and 101-2 are connected to and share the memory 102-1, and the CPUs 101-3 and 101-4 are connected to and share the memory 102-2 via respective memory buses. The CPUs 101-1, 101-2, 101-3, and 101-4 are connected to the north chip 137 via respective buses 150-1, 150-2, 150-3, and 150-4. The CPUs 101-1, 101-2, 101-3, and 101-4 are also referred to herein as processors. The north chip 137 is connected to the connection mesh fabric 155 via a bus 150-5.

In various embodiments, the compute element 100 is a multi-user mainframe computer system, single-user computer system, or a server computer or similar electronic device that has little or no direct user interface, but receives requests from other computer systems (clients). In other embodiments, the compute element 100 is implemented as a desktop computer, a portable computer, a laptop or notebook computer, a tablet computer, a pocket computer, a telephone, a smart phone, a pager, an automobile, a teleconferencing system, an instant messaging system, an appliance, or any other appropriate type of electronic device.

Each processor executes instructions stored in the memory 102-1 and 102-2, and each processor may also comprise cache memory. In various embodiments, the memory 102-1 and 102-2 are random-access semiconductor memory, storage devices, non-volatile memory, volatile memory, disk drives, or storage mediums for storing or encoding data and programs. The memory 102-1 and 102-2 are conceptually single monolithic entities, but in other embodiments the memory 102-1 and 102-2 are more complex arrangements, such as hierarchies of caches and/or other memory devices. For example, the memory 102-1 and 102-2 may exist in multiple levels of memory devices of varying sizes and speeds.

The memories 102-1 and 102-2 store or encode respective operating systems 105-1 and 105-2, which, when executed on the processors, control the operations of the compute element 100. In another embodiment, the operating systems 105-1 and 105-2 may be implemented as any executable instructions or interpretable statements such as a user application or a third-party application. The compute element 100 may use virtual addressing mechanisms that allow the programs of the compute element 100 to behave as if they only have access to a large, single storage entity instead of access to multiple, smaller storage entities. Thus, all portions of an operating system 105-1 and 105-2 are not necessarily completely contained in the same storage device at the same time.

In various embodiments, the north chip 137 is implemented as a chip, integrated circuit, circuit board, logic devices, memory, and/or a processor. The north chip 137 comprises logic 146. In an embodiment, the logic 146 is implemented as a chip, circuits, or logic devices. In another embodiment, the logic 146 comprises memory encoded with instructions or statements and a processor on which the instructions or statements execute or are interpreted. The logic 146 performs processing, operations, or functions, as further described below with reference to FIG. 6.

In an embodiment, the connection mesh fabric 155 comprises a point-to-point serial connection between the compute element 100 and the I/O element 132. In an embodiment, the connection mesh fabric 155 may be implemented via an Ethernet network. But, in other embodiments any appropriate network or combination of networks implementing any appropriate protocol suitable for communication of data and/or code to/from the compute element 100 and the I/O element 132 may be used.

In various embodiments, the I/O element 132 is implemented as a system element, an electronic device, an endpoint, a computer, or a circuit board. The I/O element 132 comprises a south chip 143 connected to a device 160 via a bus 150-7. The south chip 143 is further connected to the connection mesh fabric 155 via a bus 150-6. The south chip 143 is implemented as a chip, integrated circuit, circuit board, logic devices, memory, and/or a processor. In an embodiment, the south chip 143 is identical to the north chip 137, but the chips 137 and 143 perform different functions depending on whether they are located on the compute element I/O 100 or the I/O element 132. In another embodiment, the chips 137 and 143 are different, and each is customized for its respective element.

The south chip 143 comprises a requester identifier table 147 and logic 166. The requester identifier table 147 is stored in memory (analogous to the memory 102-1 or 102-2) and is further described below with reference to FIG. 4. In an embodiment, the logic 166 is implemented as a chip, circuits, or logic devices. In another embodiment, the logic 166 comprises memory encoded with instructions or statements and a processor on which the instructions or statements execute or are interpreted. The logic 166 performs processing, operations, or functions, as further described below with reference to FIGS. 5 and 6.

In an embodiment, the device 160 comprises a storage device or a combination of storage devices, either connected within the I/O element 132 or connected directly or indirectly to the I/O elements 132. In another embodiment, the device 160 comprises a network adapter, I/O adapter, or I/O processor that connects to a communications network. Although the device 160 is illustrated as being contained within the I/O element 132, in another embodiment, the device 160 is separate from and connected to the I/O element 132. The device 160 stores or encodes in memory (analogous to the memory 102-1 or 102-2) a physical function 188 and any number of virtual functions, such as the virtual functions 190-1, 190-2, 190-3, and 190-4.

The physical function 188 is an addressable entity that represents a physical resource and is used or specified by transactions, commands, or requests to access the represented physical resource. In an embodiment, the physical function 188 is implemented as a set of logic that is represented by a single configuration space. In other words, a physical function 188 is configurable based on configuration data stored in the physical function's associated configuration space in the memory of the device 160. The compute element 100 sends the configuration data to the device 160, and that device 160 uses that configuration data to alter the interface provided by the device 160 or to alter the actions taken by the device 160 in response to commands, transactions, or requests sent by the compute element 100 to the physical function 188 of the device 160. Examples of physical resources include ingress ports, egress ports, circuit logic, work queues, data buffers, and units of memory or storage.

The virtual functions 190-1, 190-2, 190-3, and 190-4 are addressable entities, identifiers, names, or numbers that all represent the same physical function 188. Different requesters (e.g., different operating systems 105-1 and 105-2 or different compute elements 100) specify different of the virtual functions 190-1, 190-2, 190-3, and 190-4 in their respective transaction, commands, or requests that they send to the device 160, which request access to the shared physical function 188 and the represented physical resource. These different virtual functions specified by the different requesters allow the different requesters to share the same physical function 188, allow the device 160 to distinguish between commands, requests, or transactions that arrive from different requesters, and allow different requesters to access different memory spaces within the device 160, receive different interrupts from the device 160, and send and receive different DMA (Direct Memory Access) data streams to/from the device 160.

In an embodiment, the physical resources allocated to a particular virtual function are not shared with any other virtual function; that is, the physical resources represented by a particular virtual function are exclusively allocated to one virtual function. In another embodiment, the physical resources allocated to one virtual function may be allocated to another virtual function, at the same time (concurrently) or at a different time (non-concurrently).

Although the buses 150-1, 150-2, 150-3, 150-4, 150-5, 150-6, and 150-7 are shown in FIG. 1 as relatively simple, single bus structures providing direct communication paths, in fact the buses 150-1, 150-2, 150-3, 150-4, 150-5, 150-6, and 150-7 may comprise multiple different buses or communication paths, which may be arranged in any of various forms, such as point-to-point links in hierarchical, star or web configurations, multiple hierarchical buses, parallel and redundant paths, or any other appropriate type of configuration. In an embodiment, the buses 150-1, 150-2, 150-3, and 150-4, 150-5, 150-6, and 150-7 are point-to-point serial buses, such as the PCI EXPRESS bus, but in other embodiments, any appropriate bus may be used. Furthermore, buses 150-1, 150-2, 150-3, 150-4, 150-5, 150-6, and 150-7 may comprise memory buses, I/O buses, I/O bus interface units, I/O processors, or any multiple and/or combination thereof.

The service processor 133 comprises memory 102-3 connected via a bus to a CPU 101-5. The memory 102-3 stores or encodes an virtualization intermediary element 141. The service processor 134 comprises memory 102-4 connected via a bus to a CPU 101-6. The memory 102-4 stores or encodes a mesh fabric management component 156. In an embodiment, the virtualization intermediary element 141 and/or the mesh fabric management component 156 comprise instructions or statements that execute or are interpreted by instructions that execute on the respective CPUs 101-5 and 101-6. In another embodiment, the virtualization intermediary element 141 and/or the mesh fabric management component 156 comprise circuits or logic devices in lieu of or in addition to a processor based system. The virtualization intermediary element 141 and the mesh fabric management component 156 perform processing, operations, or functions, as further described below with reference to FIG. 5. The memory 102-3 and 102-4 may be implemented analogous to the memory 102-1 and 102-2. The CPUs 101-5 and 101-6 may be implemented analogous to the CPUs 101-1, 101-2, 101-3, or 101-4.

It should be understood that FIG. 1 is intended to depict the representative major components of the compute elements 100, the connection mesh fabric 155, the I/O element 132, the service processor 133, and the service processor 134 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the compute element 100, the I/O element 132, the service processor 133, and/or the service processor 134 and that, when read and executed by one or more processors in the compute element 100, the I/O element 132, the service processor 133, and/or the service processor 134 or when interpreted by instructions that are executed by one or more processors, cause the compute element 100, the I/O element 132, the service processor 133, and/or the service processor 134 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a compute element 100, the I/O element 132, the service processor 133, and/or the service processor 134 via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring the compute element 100, the I/O element 132, the service processor 133, and/or the service processor 134 to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, compute elements, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
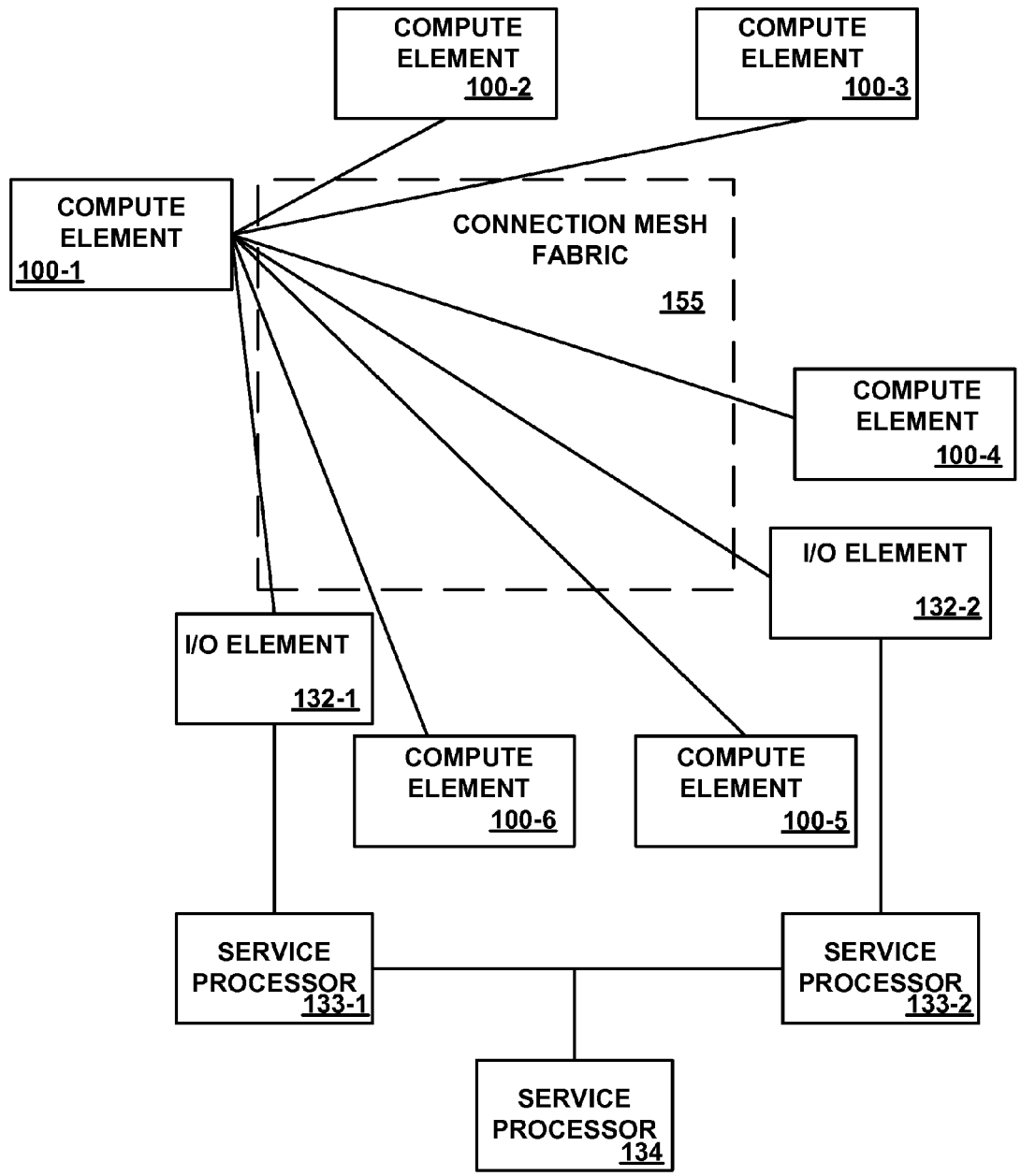
FIG. 2 depicts a block diagram illustrating the interaction of selected components of an embodiment of the invention.

FIG. 2 depicts a block diagram illustrating the interaction of selected components of an embodiment of the invention. The compute elements 100-1, 100-2, 100-3, 100-4, 100-5, 100-6, and I/O elements 132-1 and 132-2 are connected via the connection mesh fabric 155. The compute elements 100-1, 100-2, 100-3, 100-4, 100-5, and 100-6 are examples of, and are generically referred to by, the compute element 100 (FIG. 1). The I/O elements 132-1 and 132-2 are examples of, and are generically referred to by, the I/O element 132 (FIG. 1).

The connection mesh fabric 155 comprises serial point-to-point links. For convenience of illustration, FIG. 2 depicts compute element 100-1 as connected to every other compute element 100-2, 100-3, 100-4, 100-5, 100-6 and I/O element 132-1 and 132-2. But, each compute element and I/O element is connected to each and every other compute element and I/O element via high speed point-to-point links in an interconnection of everything-to-everything, which is referred to as the connection mesh fabric 155. Thus, if one point-to-point link fails, elements may still communicate to each other by hopping though another element. In an embodiment, the connection mesh fabric 155 is not necessarily confined to a single chassis or rack, but may span multiple chassis or racks.

In a serial communication link, data is sent one bit at a time, sequentially over a single channel, wire, or bus. Serial communication is in contrast to parallel communication, where several bits are sent together, on a link with several parallel channels or wires.

FIG. 2 also illustrates the service processors 133-1 and 133-2 connected to respective I/O elements 132-1 and 132-2. The I/O elements 132-1 and 132-2 are examples of, and are generically referred to by, the I/O element 132 (FIG. 1). The service processors 133-1 and 133-2 are examples of, and are generically referred to by, the service processor 133 (FIG. 1). Thus, referring again to FIG. 2, each I/O element 132-1 and 132-2 is connected to a respective different service processor 133-1 and 133-2, which is local to its respective I/O element 132. The service processors 132-1 and 132-2 are further connected to the service processor 134.

Figure 3:
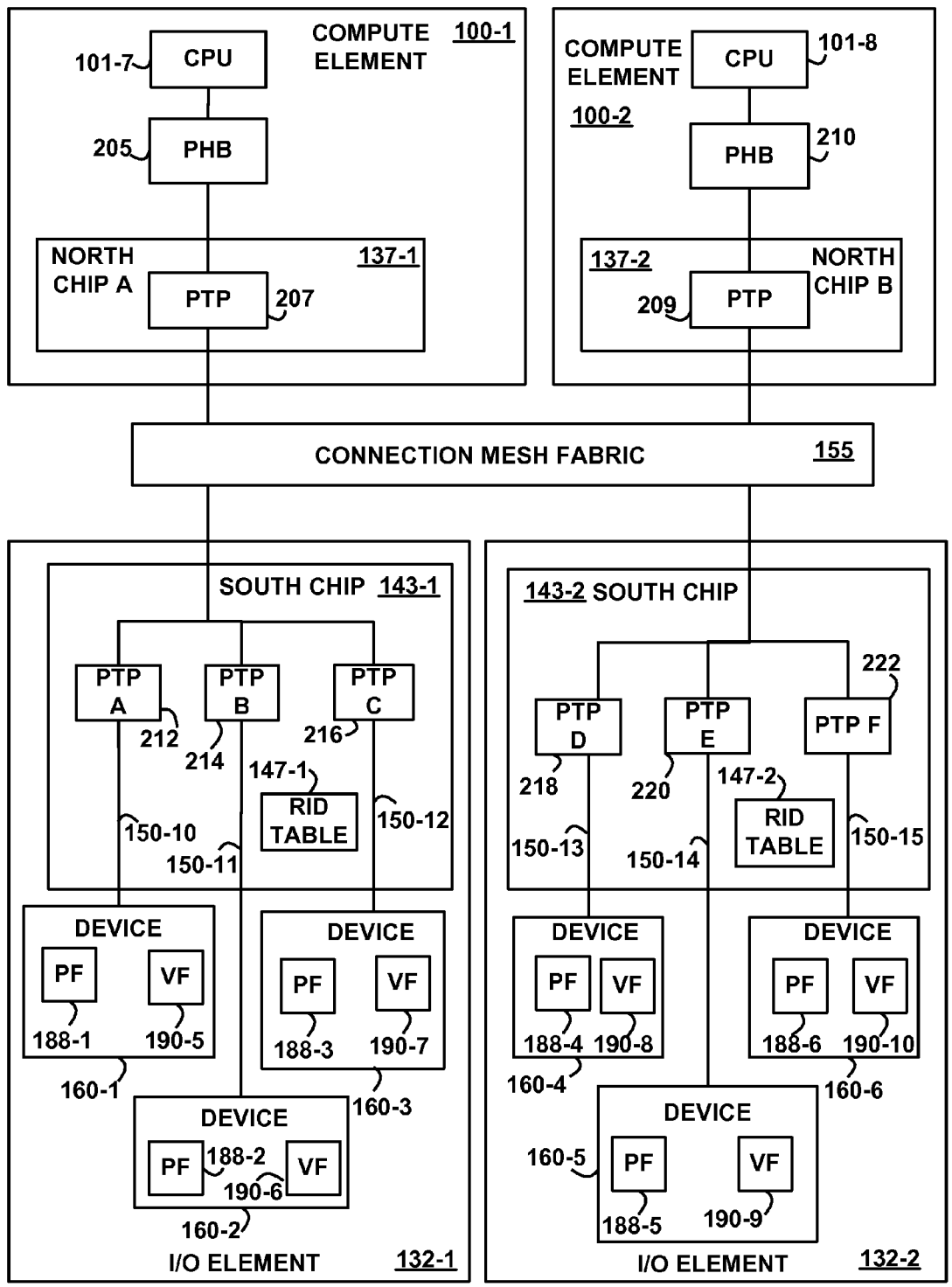
FIG. 3 depicts a block diagram illustrating more detail of selected components of an embodiment of the invention.

FIG. 3 depicts a block diagram illustrating more detail of selected components of an embodiment of the invention. As illustrated in FIG. 3, the compute elements 100-1 and 100-2 are connected via the connection mesh fabric 155 to the I/O elements 132-1 and 132-2.

The compute element 100-1 comprises a CPU 101-7 connected via a bus to a PHB (Peripheral Component Interconnect Host Bridge) 205, which is connected via a different bus to a north chip 137-1. The CPU 101-7 is an example of the CPUs 101-1, 101-2, 101-3, or 101-4 (FIG. 1). A bridge is an electronic component that forwards packets of data between two different networks, different segments of networks, or different buses that use the same communications protocol, based on a destination address in the packet. Although an embodiment of the invention is described in the context of the PCI EXPRESS bus protocol, in other embodiments any appropriate bus protocol may be used.

The north chip 137-1 comprises a PTP (PCI to PCI) bridge 207, meaning that both the ingress and the egress bus that are connected to respective ingress and egress ports of the PTP 207 are PCI buses. The north chip 137-1 is an example of, and is generically referred to by, the north chip 137 (FIG. 1).

The compute element 100-2 comprises a CPU 101-8 connected via a bus to a PHB 210, which is connected via a different bus to a north chip 137-2. The CPU 101-8 is an example of the CPUs 101-1, 101-2, 101-3, or 101-4 (FIG. 1). The north chip 137-2 comprises a PTP (PCI to PCI bridge) 209, meaning that both the ingress and the egress bus that are connected to respective ingress and egress ports of the PTP 209 are PCI buses. The north chip 137-2 is an example of, and is generically referred to by, the north chip 137 (FIG. 1).

The I/O element 132-1 comprises a south chip 143-1 connected to devices 160-1, 160-2, and 160-3 via respective buses 150-10, 150-11, and 150-12. The south chip 143-1 comprises a PTP A 212, a PTP B 214, and a PTP C 216. The south chip 143-1 further comprises a requester identifier table 147-1, which is an example of, and is generically referred to by, the requester identifier table 147 (FIG. 1).

Each of the PTP A 212, the PTP B 214, and the PTP C 216 comprises a respective egress port, which is connected to the connection mesh fabric 155 via an egress bus. The egress port is a transmitting port, meaning that the PTP sends signals to the connection mesh fabric 155 via the egress port and egress bus. Each of the PTP A 212, the PTP B 214, and the PTP C 216 further comprises an ingress port, which is connected to respective devices 160-1, 160-2, and 160-3 via respective ingress buses 150-10, 150-11, and 150-12.

An ingress port is a receiving port, meaning that the PTP receives signals on a bus from a device 160 via the ingress port. In an embodiment, the buses 150-10, 150-11, and 150-12, are point-to-point serial buses, such as the PCI EXPRESS bus, but in other embodiments, any appropriate bus may be used. In an embodiments, a single port may act as an ingress port at one time while data is being transmitted in one direction and an egress port at other time at another time while data is being transmitted in the other direction. In another embodiment, a single port only acts as an ingress or an egress port, and multiple ports are present, in order to provide bi-directional data transfer (both from a compute element 100 to a device 160 and from a device 160 to a compute element 100).

The I/O element 132-2 comprises a south chip 143-2 connected to devices 160-4, 160-5, and 160-6 via respective buses 150-13, 150-14, and 150-15. The south chip 143-2 comprises a PTP D 218, a PTP E 220, and a PTP F 222. Each of the PTP D 218, the PTP E 220, and the PTP F 222 comprises an egress port, which is connected to the connection mesh fabric 155 via a bus. Each of the PTP D 218, the PTP E 220, and the PTP F 222 further comprises an ingress port, which is connected to respective devices 160-4, 160-5, and 160-6 via respective ingress buses 150-13, 150-14, and 150-15. In an embodiment, the ingress buses 150-13, 150-14, and 150-15, are point-to-point serial buses, such as the PCI EXPRESS bus, but in other embodiments, any appropriate bus may be used. The south chip 143-2 further comprises a requester identifier table 147-2, which is an example of, and is generically referred to by, the requester identifier table 147 (FIG. 1).

The devices 160-1, 160-2, 160-3, 160-4, 160-5, and 160-6 are examples of the device 160 (FIG. 1). Each of the devices 160-1, 160-2, 160-3, 160-4, 160-5, and 160-6 comprises a respective physical function 188-1, 188-2, 188-3, 188-4, 188-5, and 188-6, which are examples of, and generically referred to by, the physical function 188 (FIG. 1). In various embodiments, some or all of the physical functions 188-1, 188-2, 188-3, 188-4, 188-5, and 188-6 are the same or different from each other. The devices 160-1, 160-2, 160-3, 160-4, 160-5, and 160-6 further comprise a respective virtual function 190-5, 190-6, 190-7, 190-8, 190-9, and 190-10, which are examples of, and are generically referred to by, combinations and/or multiples of the virtual functions 190-1, 190-2, 190-3, and 190-4 (FIG. 1). In various embodiments, some or all of the virtual functions 190-5, 190-6, 190-7, 190-8, 190-9, and 190-10 are the same or different from each other.

FIG. 4 depicts a block diagram of an example data structure for a requester identifier table 147-1, according to an embodiment of the invention. The requester identifier table 147-1 is an example of, and is generically referred to by, the requester identifier table 147 (FIG. 1). Each south chip 143 may comprise its own requester identifier table with different, partially different, or the same data because each device 160 may comprise different physical functions 188 and virtual functions.

The requester identifier table 147-1 comprises example rows 401, 402, and 403, each of which comprises a RID (requester identifier) compare value field 410, a RID mask field 411, and a destination identifier field 412. The RID compare value field 410 specifies a value against which the south chip 143 compares a command RID in a command that the device 160 sends to the compute element 100. In an embodiment, a command RID comprises a bus number of the bus with which the device 160 connects to a bridge in the south chip 143, a device number that identifies the device 160 that sends the command to the south chip 143 via the bus, and the virtual function in the device 160 that sends the command to the south chip 143 via the bus.

The RID mask field 411 specifies a value that the south chip 143 uses to select bits from the RID compare value 410 via a logical AND operation of the command RID and the RID mask field 411. The destination identifier field 412 specifies the identifier of a north chip 137 that owns or is assigned the virtual functions that are represented or identified by RIDs that are within the range specified by the RID compare value 410 and the RID mask 411 in the same row of the RID table 147-1.

Since the command RID that the south chip 143 compares against the RID compare value 410 comprises a bus number, a device number, and a function number, the use of the RID mask field 411 allows the south chip 143 to select combinations of the bus number, the device number, and the function number in the command RID for comparison to the RID compare value 410 and allows the south chip 143 to route groups of command RIDs to the same or a different north chip 137. Multiple rows with identical values in the destination identifier field 412 (e.g., the rows 401 and 402) allows the south chip 143 to route commands comprising virtual function ranges (or bus number ranges or device number ranges) that are not contiguous to the same north chip 137 or the same compute element 100.

For example, the row 401 causes the south chip 143 to route commands from the device 160 that comprise the RID values of 0x0300 through 0x030F to the north chip A 137-1, and thus to the compute element 100-1. The example row 402 causes the south chip 143 to route commands from the device 160 that comprise the RID values of 0x0400 through 0x0403 to the north chip A 137-1, and thus to the compute element 100-1. The example row 403 causes the south chip 143 to route commands from the device 160 that comprise the RID values of 0x0404 through 0x0407 to the north chip B 137-2, and thus to the compute element 100-2.

The operation of the south chip 143 that uses the requester identifier table 147-1 to translate command RIDs into destination identifiers 412 and thus route commands from devices 160 to various north chips 137 is further described below with reference to FIG. 6. Thus, each of the rows in the requester identifier table 147-1 represents a translation of a RID range to a north chip identifier of a north chip.

Figure 5:
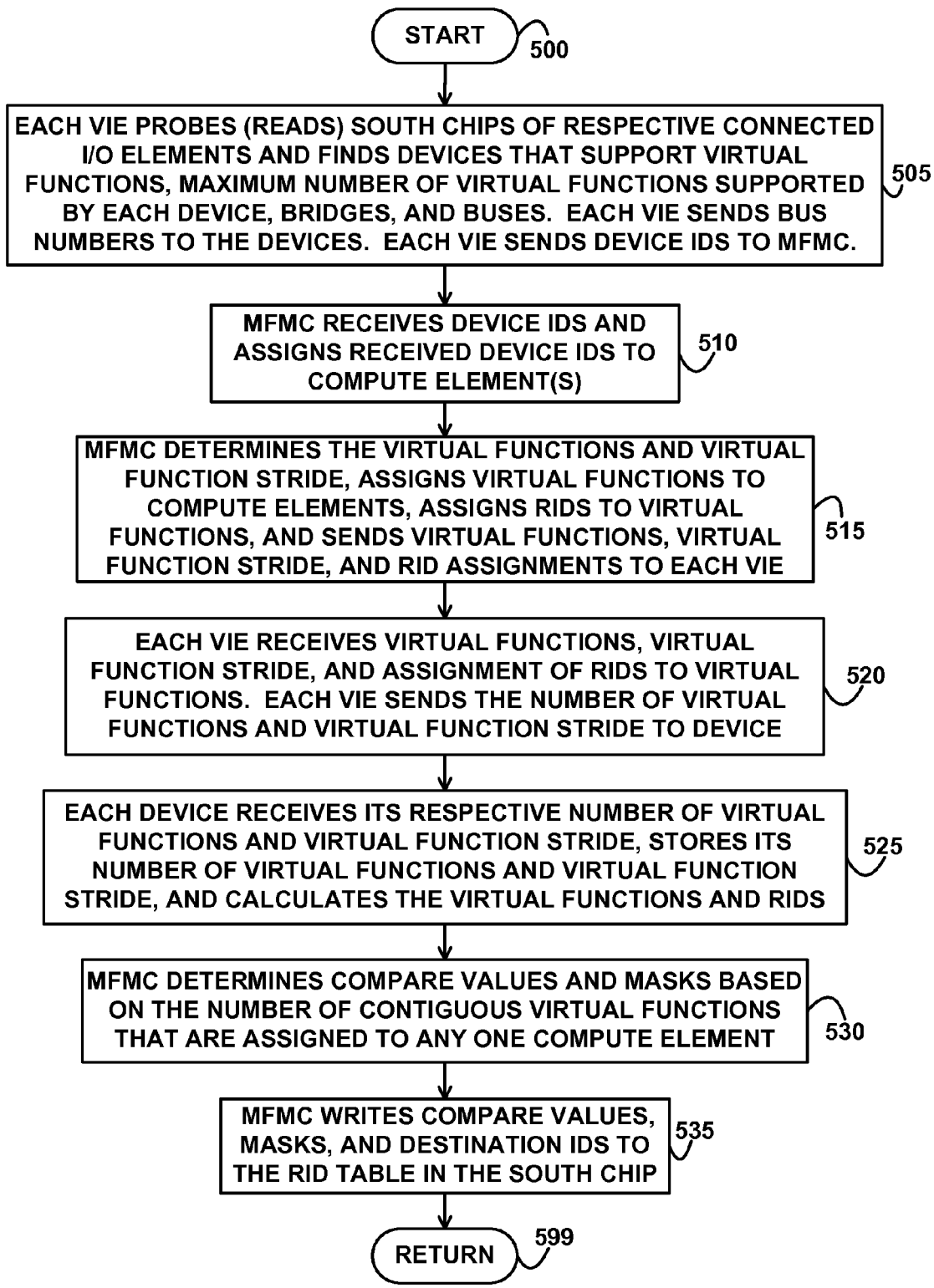
FIG. 5 depicts a flowchart of example processing for determining virtual functions, according to an embodiment of the invention.

FIG. 5 depicts a flowchart of example processing for determining virtual functions, according to an embodiment of the invention. Control begins at block 500. Control then continues to block 505 where each virtualization intermediary element 141 probes (reads) the south chip 143 of the I/O element 132 that is locally connected to the respective virtualization intermediary element 141 and finds the PTP bridges in the south chip 143 in that I/O element 132, the ingress buses that connect to the PTP bridges in that south chip 143 in that I/O element 132, and the device numbers or identifiers of the devices 160 that connect to the bridges via the buses. The virtualization intermediary element 141 further finds those devices 160 that are capable of I/O virtualization (IOV), meaning that its finds those devices 160 support virtual functions, such as the virtual functions 190-1, 190-2, 190-3, and 190-4.

That is, each virtualization intermediary element 141 sends a request or command to its locally connected I/O element 132 that requests data that describes the PTP bridges, the buses of the south chip 143, and the devices 160 that connect to the buses. In response, the south chip 143 sends, to its respective locally connected virtualization intermediary element 141, the south chip bridge identifiers of the PTP bridges in that south chip 143, and indications that the PTP bridges are connected via ingress buses to devices 160, identifiers of the connected devices 160, and indications of which of the devices 160 support virtual functions. Each virtualization intermediary element 141 sends the device identifiers and the indications of whether or not virtual functions are supported to the mesh fabric management component 156. Each virtualization intermediary element 141 sends the bus numbers that identify the buses with which the devices 160 connect to their south chip 143 to the devices 160 via the south chip 143 and via those buses, and the devices 160 store their respective bus numbers in memory in the devices 160.

Control then continues to block 510 where the mesh fabric management component 156 receives the device identifiers and indications of whether or not virtual functions are supported from all of the virtualization intermediary elements 141. In response to this receipt, the mesh fabric management component 156 assigns or allocates various of the received device identifiers to various of the compute elements 100 and/or to various of the north chips 137. For example, the mesh fabric management component 156 may assign the device 160-6 to the compute element 100-2 and may assign the device 160-1 to the compute element 100-1. The mesh fabric management component 156 may also assign the same device 160 to multiple of the compute elements 100, which share access to the device 160 via different of the virtual functions.

Assigning or allocating a device 160 to a compute element 100 or north chip 137 means that the mesh fabric management component 156 sends identifiers of the assigned devices 160 to the compute element 100 to which those devices 160 are assigned and gives those compute elements 100 permission to read/write data from/to those devices 160. The compute elements 100 subsequently send read/write commands to their assigned devices 160 and do not send read/write commands to the devices 160 to which they are not assigned.

In various embodiments, the mesh fabric management component 156 may determine the assignment of devices 160 to the compute elements 100 from requests or commands entered via a user interface or by matching the type of a compute element 100 to a type of a device 160. In various embodiments, the mesh fabric management component 156 assigns a device 160 with a type that indicates a network device to a compute element 100 with a type that indicates it contains an application server that responds to queries from a network and assigns another device with a type that indicates it comprises a storage device controller to a compute element 100 with a type that indicates it comprises a database server that reads/writes from/to a database that is stored in a storage device.

Control then continues to block 515 where the mesh fabric management component 156 determines the virtual functions for the devices 160, assigns the virtual functions to compute elements 100, assigns requester identifiers (RIDs) to the virtual functions, and sends the virtual functions, the virtual function strike, and the RID assignments (the RIDs that identify the virtual functions) to the virtualization intermediary elements 141 that are connected to the I/O elements 132 that comprise or are connected to the respective devices 160.

In an embodiment, the mesh fabric management component 156 determines the number of virtual functions to equal the number of the compute elements 100, the number of the operating systems, the number of the processors, the number of the north chips 137, or the sum of the number of virtual functions requested by the compute elements 100, the operating systems, the processors, and the north chips 137. The mesh fabric management component 156 determines the virtual functions to have an offset, or virtual function stride, between them. In various embodiments, the virtual function stride is one or more than one.

Using the example of FIG. 1, if the virtual function 190-1 equals "1" and the virtual function stride is "2," then the offset between each of the virtual function s 190-1, 190-2, 19-3, and 190-4 is "2", so the virtual function 190-2 equals "3,", the virtual function 190-3 equals "5," and the virtual function 190-4 equals "7." In various embodiments, the mesh fabric management component 156 sets the stride to be a predetermined constant or a value received from the device 160, the south chip 143, the north chip 137, the compute element 100, or from a user interface via a user input device, such as a keyboard, menu item selected via a mouse or other pointing device, or via microphone and a speech-to-text function.

Referring again to FIG. 5, assigning a virtual function to a compute element 100 means that the mesh fabric management component 156 sends the virtual functions to the compute element 100 to which that virtual function is assigned and gives the compute element 100 permission to read/write data from/to the device 160 while specifying the virtual function in commands, requests, or messages that the compute function sends to the device 160. The compute elements 100 subsequently send read/write commands or requests that specify the assigned virtual function to their assigned devices 160 and do not send read/write commands that specify the virtual functions to which they are not assigned.

In various embodiments, the mesh fabric management component 156 may determine the assignment of virtual functions to the compute elements 100 from requests or commands entered via a user interface or by matching the type of a compute element 100 to a type of virtual function, a type of a physical function 188 that the virtual function represents, and/or a type of the device 160 in which the virtual function is stored. In various embodiments, the mesh fabric management component 156 assigns a virtual function with a type that indicates a network device to a compute element 100 with a type that indicates it contains an application server that responds to queries from a network and assigns another virtual function with a type that indicates it comprises a storage device controller to a compute element 100 with a type that indicates it comprises a database server that reads/writes from/to a database that is stored in a storage device.

In an embodiment, the mesh fabric management component 156 assigns RIDs that comprise the virtual function, the bus number of the bus with which the device 160 that contains the virtual function connects to a bridge in the south chip 143, and a device number of the device 160. In another embodiment, the mesh fabric management component 156 assigns RIDs that comprise the virtual function and the bus number of the bus with which the device 160 that contains the virtual function connects to a bridge in the south chip 143.

Control then continues to block 520 where each virtualization intermediary element 141 receives the virtual functions, the virtual function stride, and the assignment of RIDs to virtual functions. Each virtualization intermediary element 141 sends the number of virtual functions and the virtual function stride to its devices 160.

Control then continues to block 525 where each device 160 receives and stores the number of virtual functions and the virtual function stride. Each device 160 uses its respective virtual function stride and number of virtual functions to calculate its virtual functions and uses the virtual functions, the number of the bus with which the device 160 connects to its bridge, and optionally the device number to calculate the device's RID. In an embodiment, the device calculates its RID by concatenating bids from the bus number, optionally the device number, and the virtual function into the RID, but in other embodiments, any appropriate technique may be used for calculating the RID.

Control then continues to block 530 where the mesh fabric management component 156 determines the RID compare values 410 and RID masks 411 based on the number of contiguous RID values representing virtual functions that are assigned to any one compute element 100. That is the mesh fabric management component 156 finds every set of RID values representing virtual functions that are contiguous (each separated by the amount of the virtual function stride) and that are assigned to or owned by the same north chip 137. Each set has a lower bound RID value and an upper bound RID value, where the lower bound RID value is less than or equal to the upper bound RID value and all other RID values in the set are greater than the lower bound RID value, less than the upper bound RID value, and separated by amount of the virtual function stride.

The mesh fabric management component 156 allocates one row in the RID table 147 for each such set, and sets the RID compare value 410 in each row to be the lower bound of its set of RID values. The mesh fabric management component 156 further calculates the difference between the upper bound RID value of the set and the lower bound RID value of the set (upper bound minus the lower bound), performs a logical complement of the difference, and sets the RID mask 411 in the row of the set to be the logical complement of the difference. (A value and its logical complement when exclusive-ored (XORed) together form all ones.) The mesh fabric management component 156 sets the destination identifier 412 to be the identifier of the north chip 137 in the compute element 100 to which the set of virtual functions represented by the RIDs is commonly assigned or owned.

Using the example of row 401 in FIG. 4, the contiguous RID values of 0x0300 through 0x030F are a set representing virtual functions that are commonly assigned to the north chip A 137-1 with the lower bound of the set being 0x0300 and the upper bound being 0x030F. In this example, the RID is 16 bits (15:0), with bits (15:8) being the bus number, bits (7:3) being the device number, and bits (2:0) being the virtual function, and the virtual function stride is one. Hence, the virtual functions in the range are 0x0 through 0xF.

Thus, the mesh fabric management component 156 assigns the RID compare value 410 in the row 401 to be the lower bound of the set (0x0300), calculates the difference of the upper bound and the lower bound to be 0x030F−0x0300=0x000F, calculates the complement of the difference 0x000F to be 0xFFF0, and sets the complement 0xFFF0 into the RID mask 411 in the row 401. The mesh fabric management component 156 also sets the destination identifier 412 in the row 401 to be the identifier of the north chip A 137-1 to which the virtual functions represented by the set of RID values 0x0300 through 0x030F are assigned.

Using the example of row 402 in FIG. 4, the contiguous RID values of 0x0400 through 0x0403 are a set representing virtual functions that are commonly assigned to the north chip A 137-1 with the lower bound of the set being 0x0400 and the upper bound being 0x0403. Thus, the mesh fabric management component 156 assigns the RID compare value 410 in the row 402 to be the lower bound of the set (0x0400), calculates the difference of the upper bound and the lower bound to be 0x0403−0x0400=0x0003, calculates the complement of the difference 0x0003 as 0xFFFC, and sets the complement 0xFFFC into the RID mask 411 in the row 402. The mesh fabric management component 156 also sets the destination identifier 412 in the row 402 to be identifier of the north chip A 137-1 to which the virtual functions represented by the set of RID values 0x0400 through 0x0403 are assigned.

Using the example of row 403 in FIG. 4, the contiguous RID values of 0x0404 through 0x0407 are a set representing virtual functions that are commonly assigned to the north chip B 137-2 with the lower bound of the set being 0x0404 and the upper bound being 0x0407. Thus, the mesh fabric management component 156 assigns the RID compare value 410 in the row 403 to be the lower bound of the set (0x0404), calculates the difference of the upper bound and the lower bound to be 0x0407−0x0404=0x0003, calculates the complement of the difference 0x0003 as 0xFFFC, and sets the complement 0xFFFC into the RID mask 411 in the row 403. The mesh fabric management component 156 also sets the destination identifier 412 in the row 403 to be identifier of the north chip B 137-2 to which the virtual functions represented by the set of RID values 0x0404 through 0x0407 are assigned.

Control then continues to block 535 where the mesh fabric management component 156 sends the determined RID compare values 410, the RID masks 411, and the destination identifiers 412 to the south chip 143. The south chip receives the requester identifier table 147. The south chip 143 receives the determined RID compare values 410, the RID masks 411, and the destination identifiers 412 from the mesh fabric management component 156 and stores them in the RID table 147 in memory of the south chip 143. Control then continues to block 599 where the logic of FIG. 5 returns.

Figure 6:
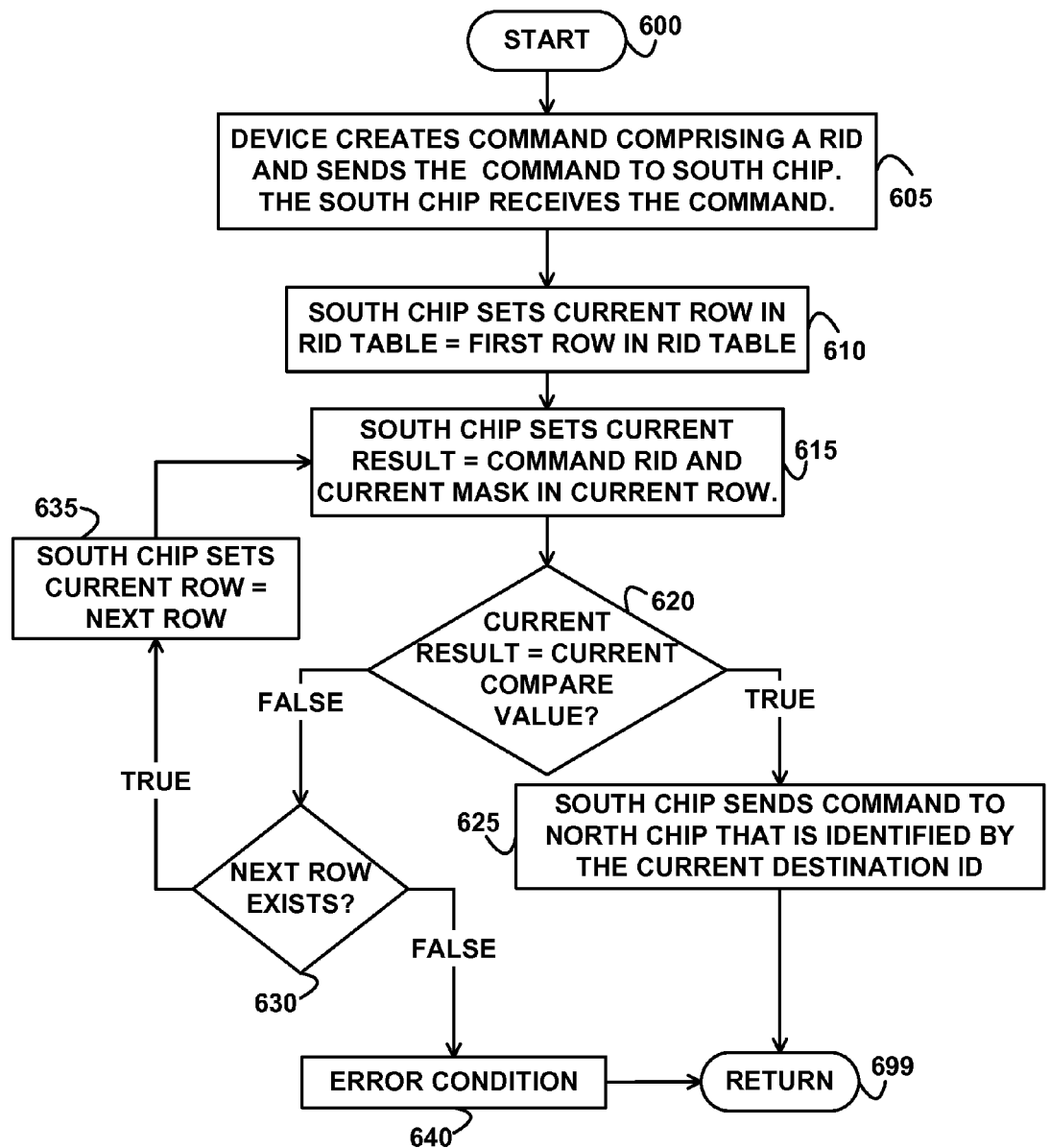
FIG. 6 depicts a flowchart of example processing for sending commands from devices to north chips, according to an embodiment of the invention.

FIG. 6 depicts a flowchart of example processing for sending commands from devices to north chips, according to an embodiment of the invention. The logic of FIG. 6 is executed for every command sent by every device 160. Control begins at block 600.

Control then continues to block 605 where the device 160 creates a command that comprises a RID and stores the command in memory in the device 160. In various embodiments, the command may be a configuration reply, a DMA (Direct Memory Access Request), a message, a packet of data, or a Memory Mapped Input/Output (MMIO) reply. The device 160 sends the command to the south chip 143 via the bus 150-7. The south chip 143 receives the command.

Control then continues to block 610 where, in response to receiving the command, the south chip 143 sets a current row in the requester identifier table 147 to the be first row in the RID table 147. Control then continues to block 615 where the south chip 143 sets a current result to be a result of a logical AND operation performed on operands of the command RID and the current RID mask 411 in the current row in the RID table 147.

Control then continues to block 620 where the south chip 143 determines whether the current result equals the current RID compare value 410 in the current row. If the determination at block 620 is true, then the current result equals the current RID compare value 410 in the current row of the RID table 147, so the RID range represented by the current row encompasses the command RID (the command RID is greater than or equal to the lower bound and less than or equal to the upper bound of the RID range), so control continues to block 625 where the south chip 143 finds the north chip identifier 412 in the current row that is assigned a virtual function identified by the command RID and sends the command via the connection mesh fabric 155 to the north chip 137 that is identified by the current destination identifier field 412 in the current row of the RID table 147. The north chip 137 receives the command, stores and processes the command, and/or sends the command to the operating system 105-1 or 105-2, which is assigned the device 160 that originated the command. Control then continues to block 699 where the logic of FIG. 6 returns.

If the determination at block 620 is false, then the current result does not equal the current RID compare value 410 in the current row of the RID table 147, so the RID range represented by the current row does not encompass the command RID, so control continues to block 630 where the south chip 143 determines whether a next row exists in the requester identifier table 147 that has not been processed by the loop that starts at block 615. If the determination at block 630 is true, then a next row exists in the requester identifier table 147 that has not been processed by the loop that starts at block 615, so control continues from block 630 to block 635 where the south chip 143 sets the current row to be the next unprocessed row in the RID table 147. Control then returns to block 615 where the south chip 143 begins processing the next current row, as previously described above.

If the determination at block 630 is false, then a next row does not exist in the requester identifier table 147 that is unprocessed by the loop that starts at block 615, i.e., all of the rows of the requester identifier table 147 have been examined by the loop that starts at block 615 and no matching RID compare value 410 has been found, so control continues from block 630 to block 640 where the south chip 143 reports an error to the device 160, as the requester identifier in the command is invalid. Control then continues to block 699 where the logic of FIG. 6 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
    storing, into a south chip, a translation of a plurality of requester identifier ranges to a plurality of north chip identifiers of a plurality of north chips, wherein the storing further comprises writing a requester identifier compare value and a requester identifier mask;
    receiving, at the south chip, a command from a device, wherein the command comprises a command requester identifier;
    in response to the receiving, determining a first requester identifier range that encompasses the command requester identifier;
    in response to the determining, finding a first north chip identifier that is assigned a virtual function identified by the command requester identifier, wherein the command requester identifier identifies the virtual function in the device and a bus with which the device connects to the south chip; and
    in response to the finding, sending, from the south chip, the command to the a first north chip identified by the first north chip identifier.

2. The method of claim 1, wherein the determining further comprises:
    performing a logical-and operation on the command requester identifier and the requester identifier mask; and
    comparing a result of the logical-and operation to the requester identifier compare value.

3. The method of claim 1, wherein the first requester identifier range comprises a plurality of requester identifiers that are contiguous.

4. The method of claim 3, wherein each of the plurality of requester identifiers that are contiguous are separated by a virtual function stride.

5. The method of claim 1, wherein the writing further comprises:
    writing the requester identifier compare value that comprises a lower bound of the first requester identifier range.

6. The method of claim 5, wherein the writing further comprises:

writing the requester identifier mask that comprises a complement of a difference between an upper bound of the first requester identifier range and the lower bound of the first requester identifier range.

7. A non-transitory computer-readable storage medium encoded with instructions, wherein the instructions when executed comprise:

storing, into a south chip, a translation of a plurality of requester identifier ranges to a plurality of north chip identifiers of a plurality of north chips, wherein the storing further comprises writing a requester identifier compare value and a requester identifier mask;

receiving, at the south chip, a command from a device, wherein the command comprises a command requester identifier;

in response to the receiving, determining a first requester identifier range that encompasses the command requester identifier;

in response to the determining, finding a first north chip identifier that is assigned a virtual function identified by the command requester identifier, wherein the command requester identifier identifies the virtual function in the device and a bus with which the device connects to the south chip; and in response to the finding, sending, from the south chip, the command to the a first north chip identified by the first north chip identifier.

8. The non-transitory computer-readable storage medium of claim 7, wherein the determining further comprises:

performing a logical-and operation on the command requester identifier and the requester identifier mask; and comparing a result of the logical-and operation to the requester identifier compare value.

9. The non-transitory computer-readable storage medium of claim 8, wherein the first requester identifier range comprises a plurality of requester identifiers that are contiguous separated by a virtual function stride.

10. The non-transitory computer-readable storage medium of claim 7, wherein the writing further comprises:

writing the requester identifier compare value that comprises a lower bound of the first requester identifier range.

11. The non-transitory computer-readable storage medium of claim 10, wherein the writing further comprises:

writing the requester identifier mask that comprises a complement of a difference between an upper bound of the first requester identifier range and the lower bound of the first requester identifier range.

12. A computer system comprising:

a plurality of compute elements comprising a plurality of north chips; and a input/output element connected to the plurality of compute elements via a connection mesh fabric, wherein the input/output element comprises a south chip that stores a translation of a plurality of requester identifier ranges to a plurality of north chip identifiers of the plurality of north chips, wherein the south chip receives a command from a device, wherein the command comprises a command requester identifier, wherein in response to the receive of the command, the south chip determines a first requester identifier range that encompasses the command requester identifier, wherein in response to the determination of the first requester identifier range, the south chip finds a first north chip identifier that is assigned a virtual function identified by the command requester identifier, wherein the command requester identifier identifies the virtual function in the device and a bus with which the device connects to the south chip, and in response to the find of the first north chip identifier, the south chip sends the command to the first north chip of the plurality of north chips that is identified by the first north chip identifier, and wherein the south chip writes a requester identifier compare value and a requester identifier mask.

13. The computer system of claim 12, wherein the south chip performs a logical-and operation on the command requester identifier and the requester identifier mask and compares a result of the logical-and operation to the requester identifier compare value.

14. The computer system of claim 13, wherein the first requester identifier range comprises a plurality of requester identifiers that are contiguous separated by a virtual function stride.

15. The computer system of claim 14, wherein the south chip further writes the requester identifier compare value that comprises a lower bound of the first requester identifier range.

16. The computer system of claim 15, wherein the south chip further writes the requester identifier mask that comprises a complement of a difference between an upper bound of the first requester identifier range and the lower bound of the first requester identifier range.

* * * * *